United States Patent
Ohzawa et al.

(10) Patent No.: US 6,542,204 B1
(45) Date of Patent: Apr. 1, 2003

(54) DISPLAY OPTICAL SYSTEM

(75) Inventors: Soh Ohzawa, Toyonaka (JP); Mituaki Shimo, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/493,268

(22) Filed: Jan. 28, 2000

(30) Foreign Application Priority Data

Feb. 1, 1999 (JP) .......................................... 11-023412

(51) Int. Cl.$^7$ ............................................ G02F 1/1335
(52) U.S. Cl. ....................... 349/5; 349/6; 349/7; 349/8; 353/34; 359/256
(58) Field of Search ............................... 349/5, 6, 7, 8; 353/34; 359/256

(56) References Cited

U.S. PATENT DOCUMENTS

| | | | |
|---|---|---|---|
| 5,475,534 A | 12/1995 | Okajima et al. | |
| 5,709,445 A | 1/1998 | Takamoto | |
| 5,947,576 A | 9/1999 | Sato et al. | |
| 5,986,806 A | 11/1999 | Sugawara | |
| 6,076,931 A | * 6/2000 | Bone et al. | 353/100 |
| 6,118,501 A | * 9/2000 | Ohzawa | 349/5 |
| 6,457,828 B1 | * 10/2002 | Hayashi | 353/20 |

FOREIGN PATENT DOCUMENTS

| | | |
|---|---|---|
| JP | 5-119283 | 5/1993 |
| JP | 5-134213 | 5/1993 |
| JP | 6-186496 | 7/1994 |
| JP | 6-331983 | 12/1994 |
| JP | 7-151994 | 6/1995 |
| JP | 8-171078 | 7/1996 |
| JP | 9-26623 | 1/1997 |

* cited by examiner

*Primary Examiner*—Robert H. Kim
*Assistant Examiner*—David Chung
(74) *Attorney, Agent, or Firm*—Burns, Doane, Swecker & Mathis, LLP

(57) ABSTRACT

A display optical system has an illumination optical system for emitting illumination light, a plurality of reflection-type display devices, a projection optical system, and a plane-parallel mirror. The reflection-type display devices individually modulate the illumination light emitted from the illumination optical system and reflect the illumination light thus modulated as projection light. The projection optical system projects the projection light and has at least one optical element included therein arranged so as to be decentered with respect to the other optical elements included therein. The plane-parallel mirror separates the illumination light into light components by reflecting a part and transmitting another part of the illumination light and then directs the light components thus separated individually to the corresponding ones of the reflection-type display devices, and integrates together the projection light reflected individually from the reflection-type display devices and then directs the projection light thus integrated together to the projection optical system.

12 Claims, 10 Drawing Sheets

DISPLAY OPTICAL SYSTEM

This application is based on application No. H11-023412 filed in Japan on Feb. 1, 1999, the entire content of which is hereby incorporated by reference.

FIELD OF THE INVENTION

The present invention relates to a compact, high-resolution display optical system that is suitable for use in an image display apparatus.

BACKGROUND OF THE INVENTION

In recent years, reflection-type LCDs (liquid crystal displays) have been receiving much attention, because they allow more efficient use of light than transmission-type LCDs. Illumination light shone onto the display surface of such a reflection-type LCD is reflected therefrom pixel by pixel as projection light that has a reflection angle substantially of the same magnitude as, but of the opposite sign to, the incident angle of the illumination light (i.e. "regularly" reflected). Some conventional display optical system employing a reflection-type LCD achieve image projection by shining illumination light substantially perpendicularly onto the display surface of the reflection-type LCD so that the illumination light will be reflected therefrom substantially perpendicularly as projection light and dividing the optical paths of the illumination light and the projection light by the use of a polarizing beam splitter or the like.

Some other conventional display optical systems achieve image projection by dividing the optical path into two parts, one for illumination light and the other for projection light, at the aperture-stop position.

However, in a display optical system of the former type, illumination light and projection light travel along the substantially same optical path in opposite directions. Thus, to divide the optical paths of the illumination light and the projection light, it is necessary to use a polarizing beam splitter or the like. In general, a polarizing beam splitter requires a considerably large glass block, and requires formation of multiple thin-film layers. Thus, its use leads to an undesirable increase in manufacturing cost. Moreover, irregularities within the medium of which the glass block is made disturb the polarization plane, and thereby make it impossible to inhibit the passage therethrough of unnecessary components of the light reflected from and polarized by the reflection-type LCD. This degrades the contrast of the projected image.

On the other hand, in a display optical system of the latter type, the projection optical system needs to have, in total, twice the F-numbers that is needed separately for illumination light and for projection light, and therefore needs to have an unduly large number of constituent lens elements as well as an unduly large lens diameter to offer satisfactory projection performance. This leads to an undesirable increase in manufacturing cost.

SUMMARY OF THE INVENTION

An object of the present invention is to provide a low-cost, compact, and high-resolution display optical system that is suitable for use in an image display apparatus.

To achieve the above object, according to one aspect of the present invention, a display optical system has an illumination optical system for emitting illumination light, a plurality of reflection-type display devices, a projection optical system, and a plane-parallel mirror. The reflection-type display devices individually modulate the illumination light emitted from the illumination optical system and reflect the illumination light thus modulated as projection light. The projection optical system projects the projection light and has at least one optical element included therein arranged so as to be decentered with respect to the other optical elements included therein. The plane-parallel mirror separates the illumination light into light components by reflecting a part and transmitting another part of the illumination light and then directs the light components thus separated individually to the corresponding ones of the reflection-type display devices, and integrates together the projection light reflected individually from the reflection-type display devices and then directs the projection light thus integrated together to the projection optical system.

According to another aspect of the present invention, a display optical system has an illumination optical system for emitting illumination light, a plurality of reflection-type display devices, a projection optical system for projecting projection light, and a plane-parallel mirror. The reflection-type display devices individually modulate the illumination light emitted from the illumination optical system and reflect the illumination light thus modulated as projection light. The plane-parallel mirror separates the illumination light into light components by reflecting a part and transmitting another part of the illumination light and then directs the light components thus separated individually to the corresponding ones of the reflection-type display devices, and integrates together the projection light reflected individually from the reflection-type display devices and then directs the projection light thus integrated together to the projection optical system. In this display optical system, the projection optical system has optical elements included therein arranged so as to allow separation of the optical paths of the illumination light and the projection light.

According to still another aspect of the present invention, a display optical system has an illumination optical system for emitting illumination light, a plurality of reflection-type display devices, a projection optical system for projecting projection light, and a plane-parallel mirror. The reflection-type display devices individually modulate the illumination light emitted from the illumination optical system and reflect the illumination light thus modulated as projection light. The plane-parallel mirror separates the illumination light into light components by reflecting a part and transmitting another part of the illumination light and then directs the light components thus separated individually to the corresponding ones of the reflection-type display devices, and integrates together the projection light reflected individually from the reflection-type display devices and then directs the projection light thus integrated together to the projection optical system. In this display optical system, the projection optical system has optical elements included therein arranged so as to correct the astigmatic difference caused by the plane-parallel mirror.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiment 1

Figure 1:
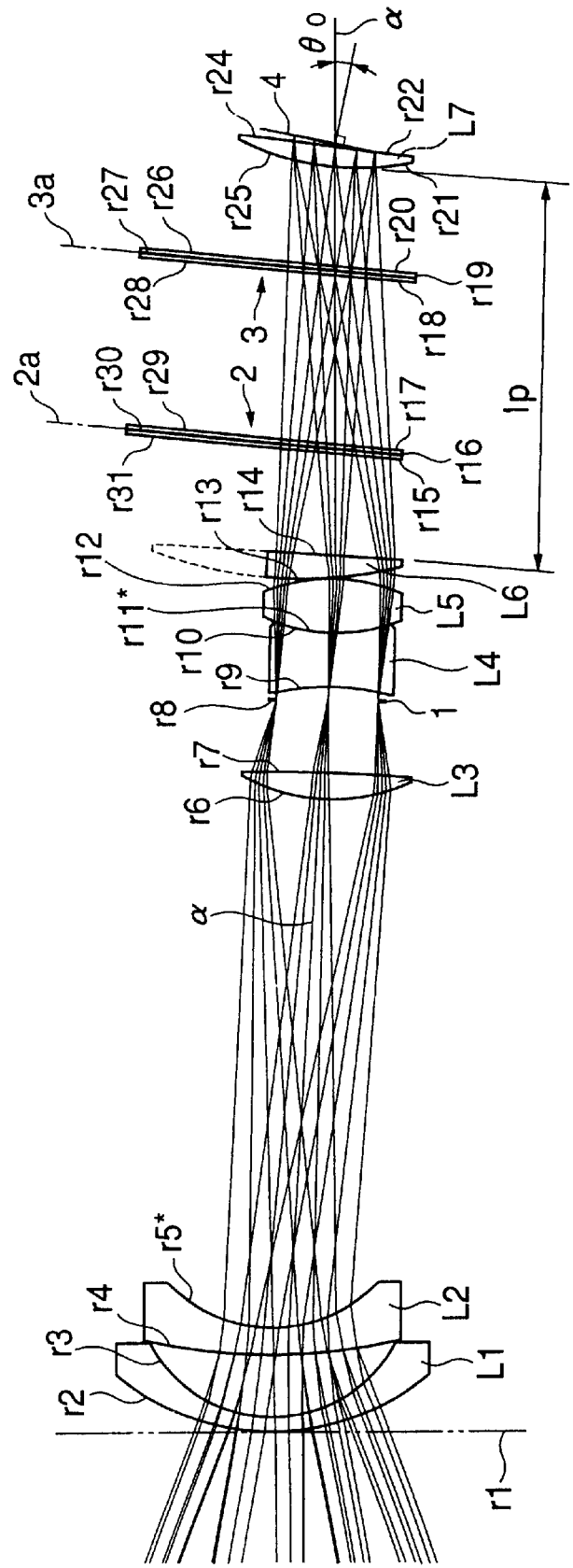
FIG. 1 is a diagram illustrating the construction of the projection optical system employed in a first embodiment (Example 1) of the invention.

Hereinafter, embodiments of the present invention will be described with reference to the accompanying drawings. Note that, in the following descriptions, the components that play the same or corresponding roles in different embodiments will be identified with the same reference symbols. FIG. 1 is a diagram illustrating the construction of the projection optical system employed in the display optical system of a first embodiment of the present invention. In this figure, the left-hand side is the object side, and the right-hand side is the image side. Here, the coordinate system is defined as follows: the Y axis points upward; the Z axis points rightward; and the X axis points toward the back of the figure perpendicularly to the plane of the figure. Thus, FIG. 1 shows a section taken along the Y-Z plane. Arrow "a" indicates a rotation about the X axis with respect to the Y axis, and a counter-clockwise rotation angle as observed when the observer is looking in the X-axis direction, i.e. as observed when the observer is facing the plane of the figure from the front, takes a positive value.

Although not shown, in reality, on the left-hand side of what is shown in FIG. 1 is disposed an object plane (a screen). The projection optical system is provided with, from the object-plane side, lens elements L1, L2, and L3, an aperture stop 1, lens elements L4 to L6, plane-parallel mirrors 2 and 3, a lens element L7 acting as a condenser lens, and a reflection-type display device 4 composed of a reflection-type LCD and acting as an image plane. Note that reference symbol a indicates the optical axis of the projection optical system.

Figure 2:
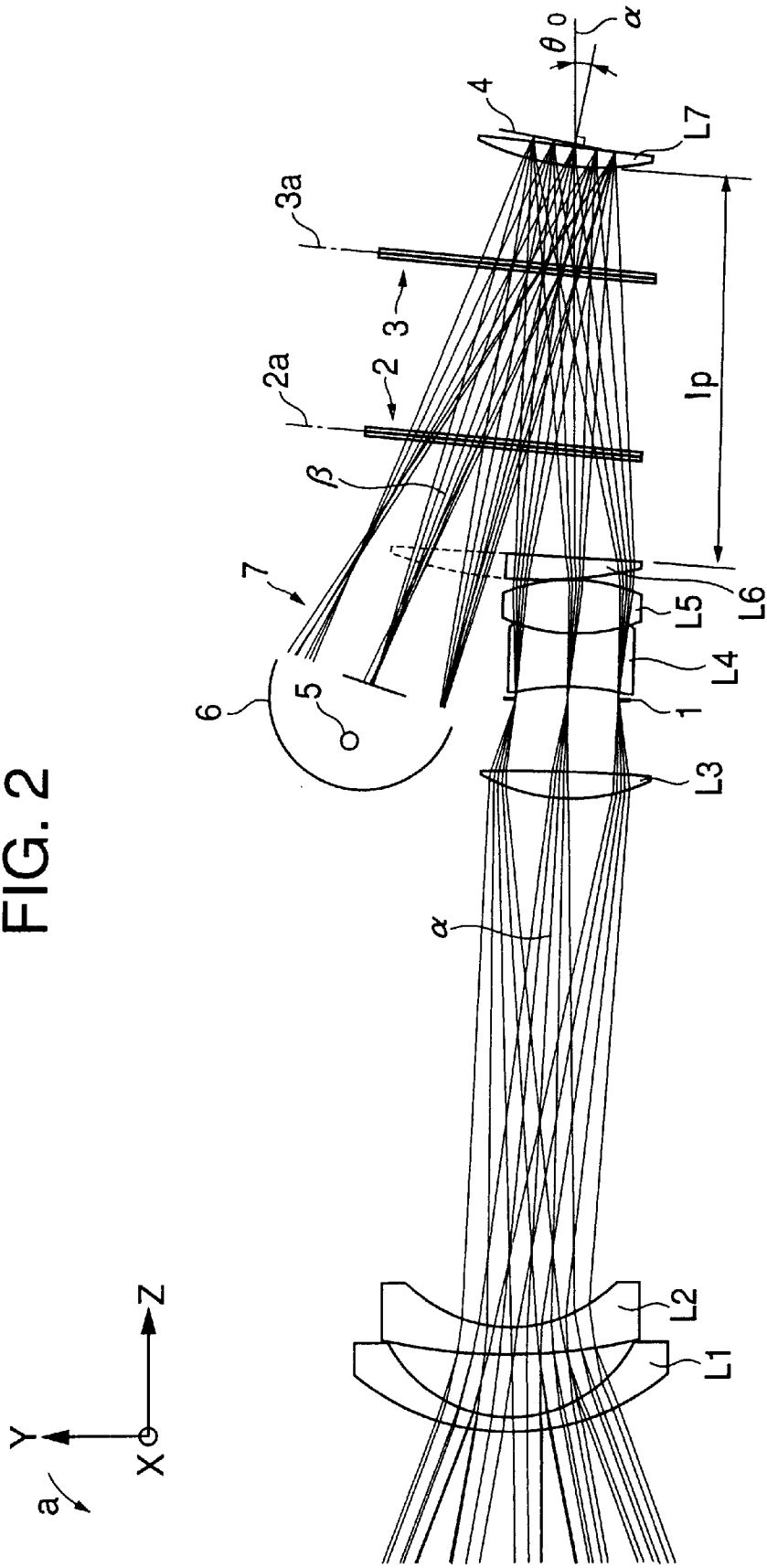
FIG. 2 is a diagram illustrating the construction of the entire display optical system of the first embodiment.

FIG. 2 is a diagram illustrating the construction of the entire display optical system of the first embodiment that includes, in addition to the projection optical system shown in FIG. 1, an illumination optical system. The illumination optical system is composed of, for example, a light source 5 and an umbrella-shaped reflector 6, as shown in FIG. 2. The illumination optical system emits, as illumination light, a light beam 7, which is then directed, via the plane-parallel mirrors, the condenser lens, and the refection-type display device, to the projection optical system. Note that reference symbol β indicates the optical axis of the illumination optical system.

Figure 3:
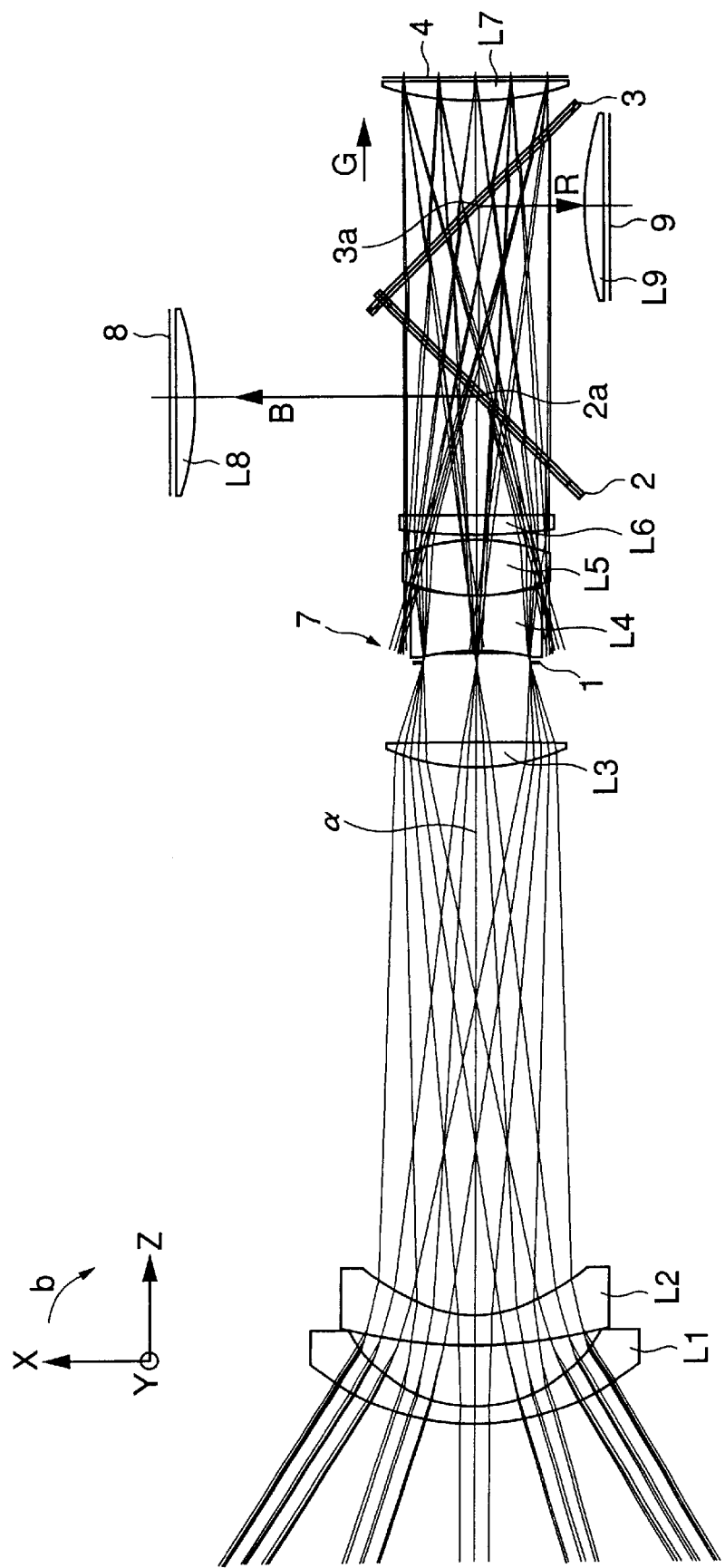
FIG. 3 is a diagram illustrating the construction of the display optical system of the first embodiment as seen from the Y-axis direction.

FIG. 3 is a diagram illustrating the display optical system of the first embodiment as seen from the Y-axis direction.

Here, the coordinate system is defined as follows: the X axis points upward; the Z axis points rightward; and the Y axis points toward the reader perpendicularly to the plane of the figure. Thus, FIG. 3 shows a section taken along the X-Z plane. Arrow "b" indicates a rotation about the Y axis with respect to the X axis, and a counter-clockwise rotation angle as observed when the observer is looking in the Y-axis direction, i.e. a clockwise rotation angle as observed when the observer is facing the plane of the figure from the front, takes a positive value. Note that the illumination optical system is omitted in FIG. 3. The plane-parallel mirrors 2 and 3 are disposed at an angle of about 45° with respect to the optical axis α of the projection optical system in opposite directions as seen on the plane of the figure so as to be substantially perpendicular to each other. Here, the rotation axes 2a and 3a of the plane-parallel mirrors 2 and 3 lie on the YZ section shown in FIGS. 1 and 2. The positional relationship between the plane-parallel mirrors 2 and 3 is determined in consideration of the space secured for the placement of optical elements such as lens elements and the designed optical path.

The plane-parallel mirrors are each a dichroic mirror formed by cementing together two identical plane-parallel glass plates with a dichroic coating applied between them, and thus serve to separate colors. These dichroic mirrors have polarization characteristics such that they reflect P-polarized light and S-polarized light in different frequency ranges. Accordingly, as will be described later, the plane-parallel mirrors selectively reflect the projection light that is modulated by and reflected from the reflection-type display device pixel by pixel. The light beam 7 emitted from the illumination optical system mentioned above first strikes the plane-parallel mirror 2, which, as indicated by arrow B in FIG. 3, reflects only the light component covering the wavelength range of blue light and transmits the light components covering other wavelength ranges. The light beam reflected therefrom is transmitted through the lens element L8 acting as a condenser lens and then strikes the reflection-type display device 8 composed of a reflection-type LCD. The light beam is then modulated by and reflected from the reflection-type display device 8 pixel by pixel as projection light, is then transmitted through the lens element L8 once again, and is then reflected from the plane-parallel mirror 2 so as to be directed into the projection optical system.

The light beam transmitted through the plane-parallel mirror 2 strikes the plane-parallel mirror 3, which, as indicated by arrow R, reflects only the light component covering the wavelength range of red light and transmits the remaining light component covering the wavelength range of green light. The light beam reflected therefrom is transmitted through the lens element L9 acting as a condenser lens and then strikes the reflection-type display device 9 composed of a reflection-type LCD. The light beam is then modulated by and reflected from the reflection-type display device 9 pixel by pixel as projection light, is then transmitted through the lens element L9 once again, is then reflected from the plane-parallel mirror 3, and is then transmitted through the plane-parallel mirror 2 so as to be directed into the projection optical system.

The light beam transmitted through the plane-parallel mirror 3 and thus including only the light component covering the wavelength range of green light travels in the direction indicated by arrow G so as to be transmitted through the lens element L7 acting as a condenser lens and then strikes the reflection-type display device 4 composed of a reflection-type LCD. The light beam is then modulated by and reflected from the reflection-type display device 4 pixel by pixel as projection light, is then transmitted through the lens element L7 once again, and is then transmitted through the plane-parallel mirrors 3 and 2 so as to be directed into the projection optical system. In this way, the light components of projection light covering different wavelength ranges are integrated together so that a color image will be projected on a screen.

In this embodiment, color separation of the illumination light coming from the illumination optical system and color integration of the projection light coming from a plurality of reflection-type display devices are performed by the use of the two plane-parallel mirrors disposed at an angle with respect to each other within the projection optical system. Moreover, in the projection optical system, at least one optical element (e.g. lens element) is so arranged as to be decentered. This design makes it possible to perform both color separation and color integration by the use of a single set of members, and to correct the astigmatic difference caused by the inclined plane-parallel mirrors by the action of the decentered optical element. This contributes to cost reduction.

More specifically, on the plane of FIGS. 1 and 2, the lens elements L1 to L7 and the aperture stop 1 (i.e. the optical elements) are so arranged as to be somewhat decentered and rotated. The details of this arrangement will be presented later in the form of construction data. Moreover, in this embodiment, all the optical surfaces of the lens elements included in the projection optical system are formed as rotationally-symmetrical surfaces. This helps simplify the manufacture of those lens elements and thereby achieve cost reduction.

Moreover, in this embodiment, between the aperture stop and the reflection-type display device is disposed a greatly decentered optical element, and the following condition is fulfilled:

$$5° < \theta o < 15°$$

wherein
 θo represents the angle between a normal to the surface of the reflection-type display device and the light ray traveling from the center of the object plane to the center of the image plane.

By disposing a greatly decentered optical element between the aperture stop and the reflection-type display device in this way, it is possible to allow the light beam traveling from the reflection-type display device to the projection optical system to be inclined with respect to a normal to the reflection-type display device, and thereby separate illumination and projection light. Specifically, the lens element L6 mentioned above serves as such an optical element. As shown in FIG. 1, the lens element L6 has its optical surfaces formed as rotationally-symmetrical surfaces; however, as indicated by broken lines, it has an upper portion thereof cut off, and is so arranged as to be greatly decentered in the positive direction along the Y axis.

Moreover, as shown in FIGS. 1 and 2, θo represents the angle between a normal to the surface of the reflection-type display device 4 and the optical axis α. If this angle is equal to or less than the lower limit of the condition noted above, it is impossible to design the optical system to allow separation of illumination and projection light. In contrast, if the angle is equal to or greater than the upper limit of the condition, it is impossible to correct the trapezoidal distortion and the coma aberration caused by oblique projection from the reflection-type display device without increasing the number of decentered lens elements and also increasing the decentering amount of those decentered lens elements. This leads to an undesirable increase in manufacturing cost.

Furthermore, in this embodiment, the three light components of projection light coming from the reflection-type display devices provided separately for R, G, and B light are integrated together by the use of two plane-parallel mirrors (in this embodiment, the plane-parallel mirrors 2 and 3) and then projected, and the two plane-parallel mirrors are disposed at an angle with respect to the optical axis in opposite directions. This arrangement allows coma and other aberrations than astigmatism to appear in such a way as to cancel themselves out, and thus makes aberration correction easier. Moreover, the two plane-parallel mirrors are so disposed as not to be inclined with respect to each other as seen on the plane that includes the illumination light source, the center of the aperture stop, and the center of the projected image, more specifically, on the plane that includes the light source 5, the center of the aperture stop 1, and the center of the image projected onto the non-illustrated screen, that is, on the Y-Z plane shown in FIG. 2. This arrangement helps reduce the distance between the plane-parallel mirrors and thereby shorten the total length of the entire optical system.

Moreover, in this embodiment, between the plane-parallel mirror and the reflection-type display device is disposed a positively-powered lens element, i.e. a condenser lens, having an optical power Φp, and the following condition is fulfilled:

$$0.5 < \Phi p \times lp < 1.0$$

wherein
 lp represents the optical path length between the two optical elements disposed immediately on both sides of the two plane-parallel mirrors, as traveled by the light ray that eventually reaches the center of the image plane.

Specifically, suppose that, in FIGS. 1 and 2, the optical power of the lens element L7 acting as a condenser lens is Φp and the length along the optical axis α between the lens elements L6 and L7 is lp, then the condition noted above is fulfilled.

If the value of the condition noted above is equal to or less than its lower limit, the optical power of the condenser lenses disposed immediately in front of the reflection-type display devices is so weak that the light rays traveling around the plane-parallel mirrors take substantially telecentric paths, and thus the projection optical system needs to have an unduly long total length. This is because proper aberration correction as required cannot be achieved without making the total length of the projection optical system unduly long. In contrast, if the value of the condition is equal to or greater than its upper limit, the optical power of the condenser lens is so strong that the image of the aperture stop is located around the plane-parallel mirrors. In this case, to place the light source at the position of the image of the aperture stop, i.e. at the position conjugate with the aperture stop, it is necessary to adopt an illumination arrangement conforming to so-called Koehler illumination, which additionally requires a relay lens. This leads to an undesirable increase in manufacturing cost.

Moreover, within the projection optical system, the directions in which the optical elements such as the lens elements are decentered lie on the same plane (in this embodiment, in the Y-Z plane) that includes, as described previously, the rotation axes of the plane-parallel mirrors. This arrangement makes it possible to align the direction of astigmatic difference caused by the inclined plane-parallel plates with the direction in which the optical elements are decentered, with the result that the astigmatic difference resulting from decentered arrangement of the optical elements.

In addition, between the aperture stop and the plane-parallel mirror is disposed an optical element (in this embodiment, the lens element L6) that is greatly decentered so as to have a shape such that the optical path length therethrough monotonically increases in the direction in which it is decentered within the effective optical path range. This arrangement makes it possible, owing to the prismatic effect exerted by this optical element, to achieve the desired inclination of the optical path that is required to separate illumination and projection light, and simultaneously achieve proper correction of aberrations by causing astigmatic difference which cancels out the astigmatic difference caused by the plane-parallel plates.

The theory will be described below that provides the basis for cancellation of the astigmatic difference caused by an inclined plane-parallel plate by the astigmatic difference resulting from decentered arrangement of an optical element. According to papers written by Forbes, Stone, et al., in a non-axisymmetric optical system, if a light ray traveling from the center of the object plane to the center of the image plane (called the base lay) is assumed to be the reference, the second-order coefficient obtained by applying Taylor expansion to a characteristic function with respect to the base ray represents a first-order property as exemplified by a property such as focal length, magnification, or principal point position that is given as a first-order quantity. In this embodiment, the "base ray" corresponds to the optical axis α that extends from the center of the screen to the center of the reflection-type optical device.

The above-mentioned papers are:

"Characterization of first-order optical properties for asymmetric systems" J. Opt. Soc. Am, A9,478–489 (1992) by Bryan D. Stone and G. W. Forbes, and "Foundations of first-order layout for asymmetric systems: an application of Hamilton's methods" J. Opt. Soc. Am, A9,96–109 (1992) by Bryan D. Stone and G. W. Forbes.

According to this theory, in this embodiment, the X-direction focal length and the Y-direction focal length of each element (here, each lens surface) respectively fulfill the following conditions:

X direction . . .

$$M_x = \frac{-1}{\frac{\partial^2 f}{\partial x^2}(n \cdot \cos(\theta_1) - n' \cdot \cos(\theta_1'))}$$

Y direction . . .

$$M_Y = \frac{(-1)\cos(\theta_1) \cdot \cos(\theta_1')}{\frac{\partial^2 f}{\partial y^2}(n \cdot \cos(\theta_1) - n' \cdot \cos(\theta_1'))}$$

wherein n represents the refractive index of the medium that exists immediately in front of the element;

n' represents the refractive index of the medium that exists immediately behind the element;

$\theta_1$ represents the angle of incidence with respect to the element;

$\theta_1'$ represents the angle of emergence with respect to the element;

f represents the formula defining the surface shape in the form of f=f(x, y); and $$\frac{\partial^2 f}{\partial x^2}, \frac{\partial^2 f}{\partial y^2}$$

represent the second-order derivatives of f in the X and Y directions, respectively, at the incident point of the base ray, and thus represent the local curvatures in the X and Y directions.

Hence, the difference between the X-direction focal length and the Y-direction focal length $\Delta_{element}=M_X-M_Y$ is given by the following formula:

$$\Delta_{element} = \frac{(-1)\left(\frac{\partial^2 f}{\partial y^2} - \frac{\partial^2 f}{\partial x^2}\cos(\theta_1) \cdot \cos(\theta_1')\right)}{\frac{\partial^2 f}{\partial x^2} \cdot \frac{\partial^2 f}{\partial y^2}(n \cdot \cos(\theta_1) - n' \cdot \cos(\theta_1'))}$$

Moreover, the difference in back focal distance among the light rays passing through the two plate mirrors is obtained, by calculation based on Snell's law, as:

$$\Delta_{mir}=(d_1+d_2)\{\cos(2 \cdot \theta'_m)-\cos(2 \cdot \theta_m)\}/2 \cdot n_m \cdot \{\cos(\theta'_m)\}^2$$

wherein $d_1$ represents the optical path length traveled by the light rays passing through the first plate mirror;

$d_2$ represents the optical path length traveled by the light rays passing through the second plate mirror;

$\theta_m$ represents the angle of incidence at which the light rays strike the front surface of the first plate mirror;

$\theta'_m$ represents the angle of emergence at which the light rays exit from the front surface of the first plate mirror; and $n_m$ represents the refractive index of the plate mirror.

Note that, if it is assumed that, on the X-Y plane, the rotation angle of the planes of incidence and emergence through which the light rays enter and exit from the plane parallel mirrors relative to the planes of incidence and emergence through which the light rays enter and exit from the other elements is Φ, then the difference between the X-direction back focal distance and the Y-direction back focal distance is defined by the following formula:

$$\Delta'_{mir}=\{\cos(\Phi)-\sin(\Phi)\}\Delta_{mir}.$$

This difference in back focal distance can be corrected by designing each element to have different powers in the X and Y directions on one or more surfaces thereof according to the above-noted formula of the focal length. In this way, it is possible to correct the deviation of the imaging position in the X and Y directions.

To correct such deviation, it is preferable that the following condition be fulfilled:

$$0.05 \leq |\Delta'_{mir}/\Delta_{element}| \leq 10.$$

If the value of the condition is greater than its upper limit, the deviation is undercorrected. In contrast, if the value of the condition is less than its lower limit, the deviation is overcorrected, or the surface suffers from unduly large aberrations other than deviation.

Embodiment 2

Figure 6:
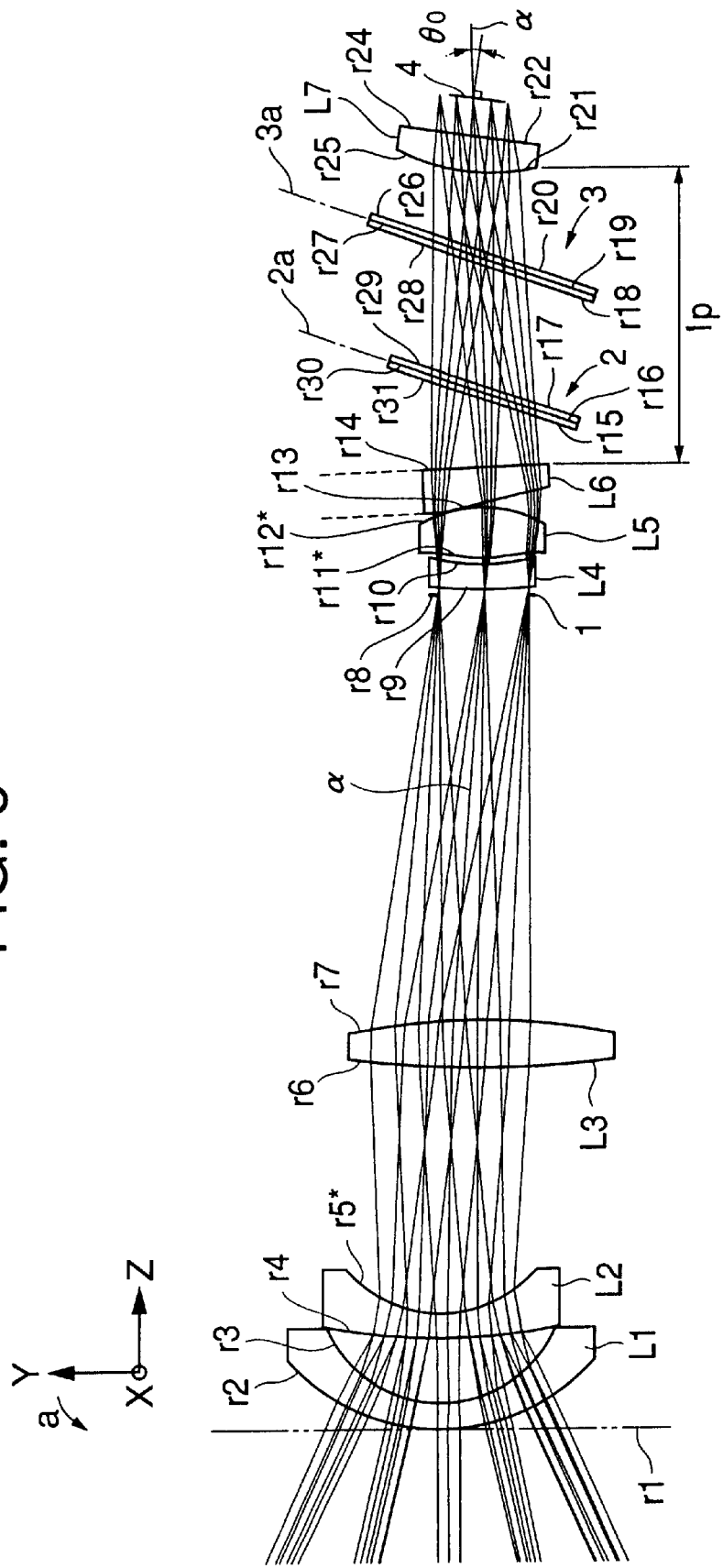
FIG. 6 is a diagram illustrating the construction of the projection optical system employed in a second embodiment (Example 2) of the invention.
Figure 7:
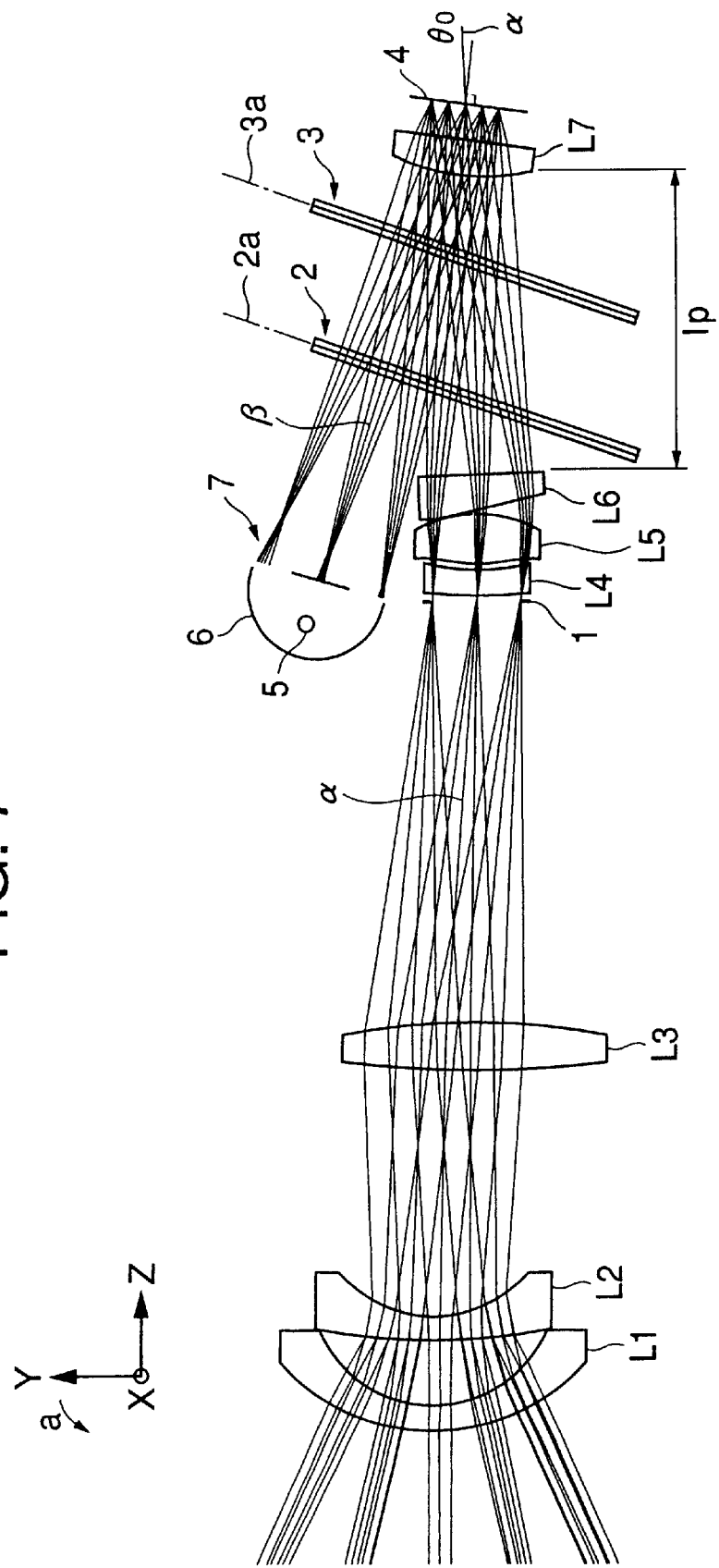
FIG. 7 is a diagram illustrating the construction of the entire display optical system of the second embodiment.
Figure 8:
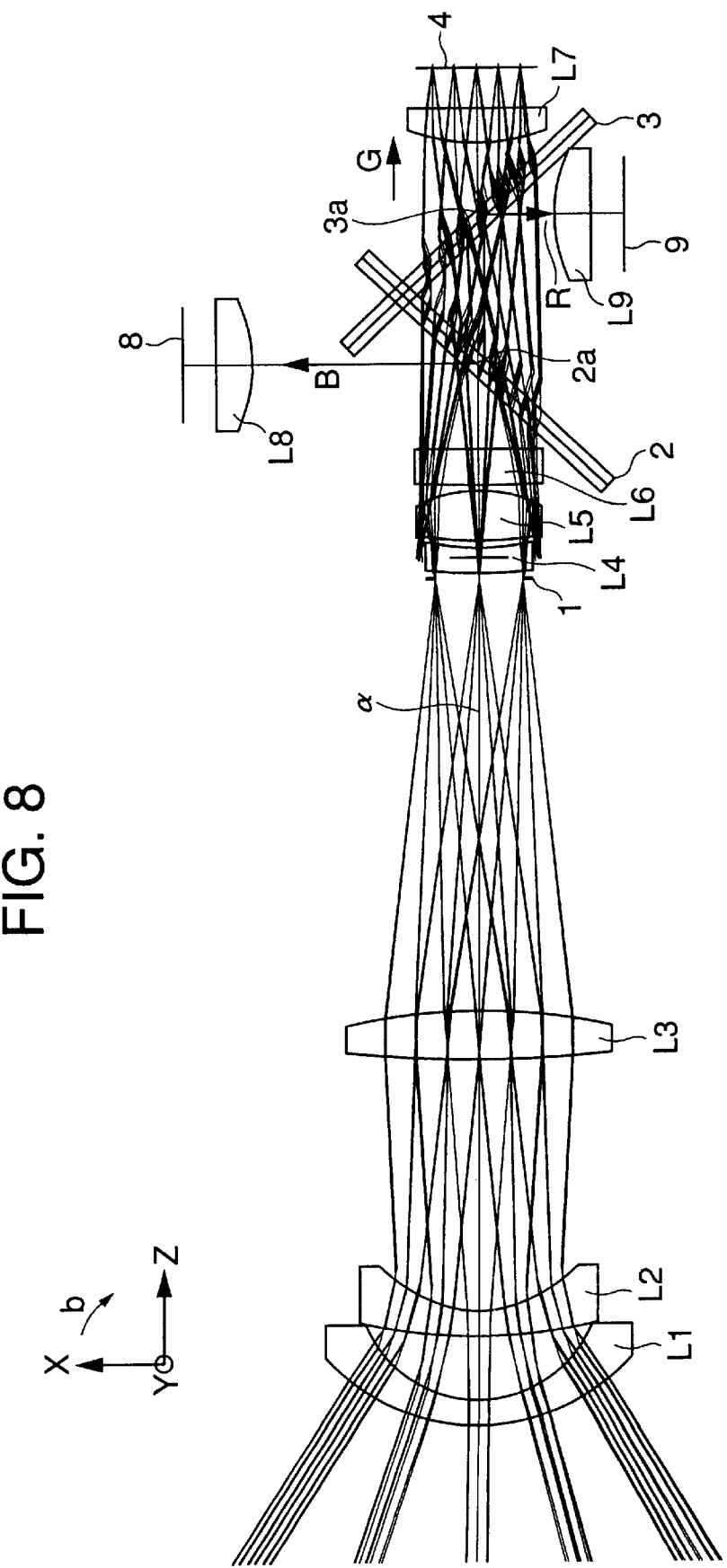
FIG. 8 is a diagram illustrating the construction of the display optical system of the second embodiment as seen from the Y-axis direction.

FIG. 6 is a diagram illustrating the construction of the projection optical system employed in the display optical system of a second embodiment of the present invention; FIG. 7 is a diagram illustrating the construction of the entire display optical system that includes, in addition to the projection optical system shown in FIG. 6, an illumination optical system; and FIG. 8 is a diagram illustrating the display optical system of the second embodiment as seen from the Y-axis direction. As shown in these figures, the display optical system of the second embodiment has basically the same construction as that of the first embodiment (see FIGS. 1 to 3).

However, in the second embodiment, as shown in FIG. 7, the plane-parallel mirrors 2 and 3 are so arranged that their rotation axes 2a and 3a intersect the optical axis β of the illumination optical system substantially at right angles on the Y-Z plane. This arrangement helps maintain the polarization plane of the illumination light that illuminates the center of the image surface of the reflection-type optical device. That is, this arrangement allows the light beam that is, for example, P-polarized, when striking the plane-parallel mirror 2 to remain P-polarized when striking the plane-parallel mirror 3 without any rotation of its polarization plane. By arranging the plane-parallel mirrors 2 and 3 in this way, it is possible to make uniform the characteristics of the plane-parallel mirrors 2 and 3 that serve as dichroic mirrors for performing color separation of illumination light, and thus prevent uneven color distribution.

EXAMPLES

Hereinafter, examples of display optical systems embodying the present invention will be presented with reference to their construction data, graphic representations of aberrations, and other data. Tables 1 and 2 list the construction data of Examples 1 and 2, which respectively correspond to the first and second embodiments described above and have lens arrangements as shown in FIGS. 1 to 3 and FIGS. 6 to 8.

In the construction data of the examples, ri (i=1, 2, 3, ...) represents the ith surface counted from the object-plane side. Moreover, the radius of curvature, the axial distance, the refractive index for the d line, and the Abbe number for each surface are shown. In each example, a surface whose radius of curvature is marked with an asterisk (*) is a refractive optical surface having an aspherical shape or a surface exerting a refracting effect equivalent to an aspherical surface. The surface shape of an aspherical surface shape is defined by the following formula:

$$Z = ch^2/[1+\sqrt{\{1-(1+k)c^2h^2\}}] + Ah^4 + Bh^6 + Ch^8 + Dh^{10} + Eh^{12}$$

wherein

Z represents the displacement from the reference surface along the optical axis;

h represents the height in a direction perpendicular to the optical axis;

c represents the paraxial curvature; and k, A, B, C, D, and E represent the aspherical coefficients.

In the construction data, r1 represents the reference surface for decentering, which is a virtual plane obtained by shifting the screen surface translationally in the Z-axis direction, and which thus has no optical function. Moreover, in the construction data, XDE, YDE, and ZDE represent the translational decentering of the surfaces in the X, Y, and Z directions, respectively. In addition, ADE represents the rotational decentering about the X axis, with a counter-clockwise rotation angle taking a positive value. Note that, in the construction data, all lengths are given in mm and all angles are given in deg.

Figure 4:
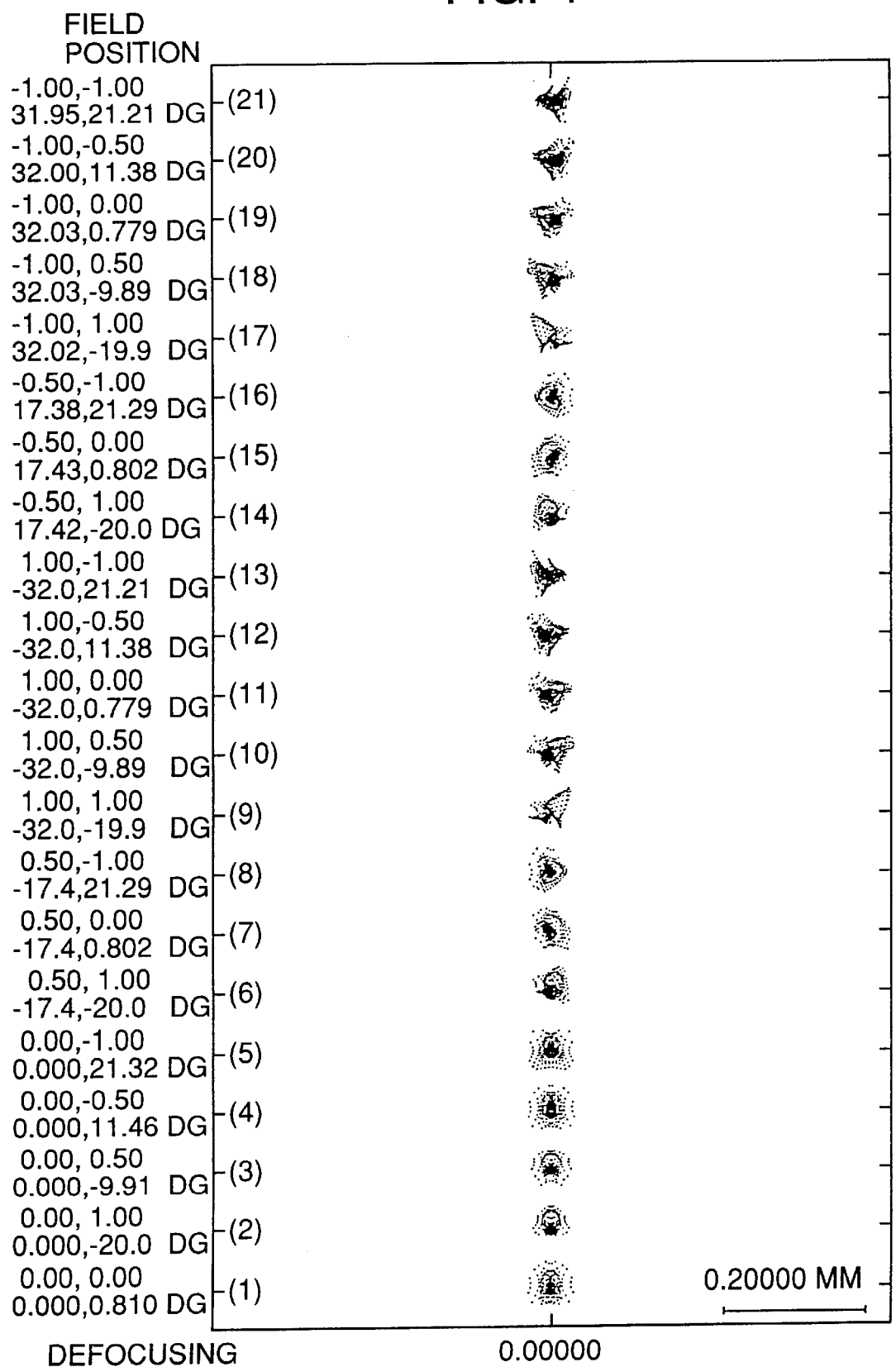
FIG. 4 is a spot diagram of the display optical system of Example 1.
Figure 5:
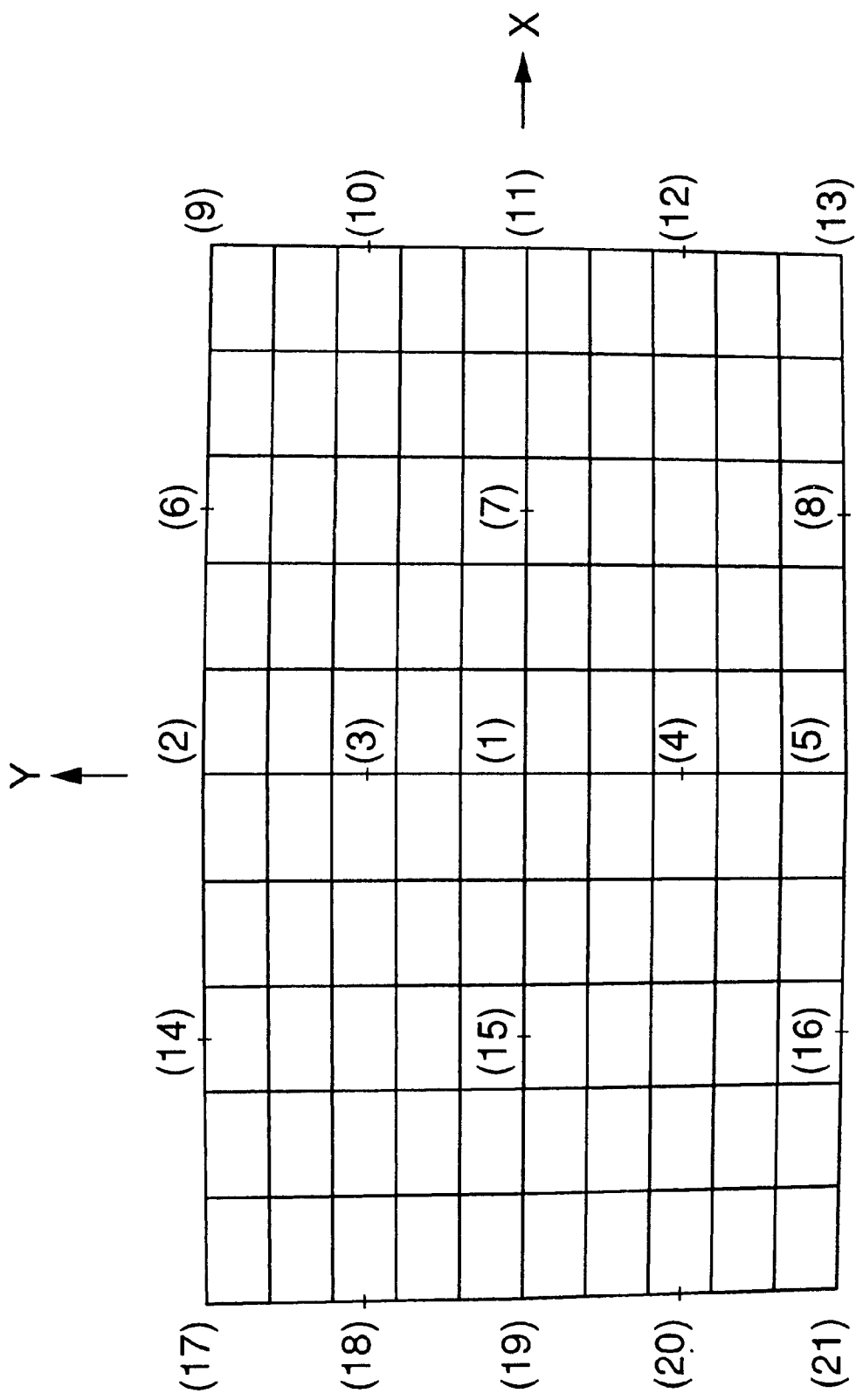
FIG. 5 is a distortion diagram of the display optical system of Example 1, with values actually measured.
Figure 9:
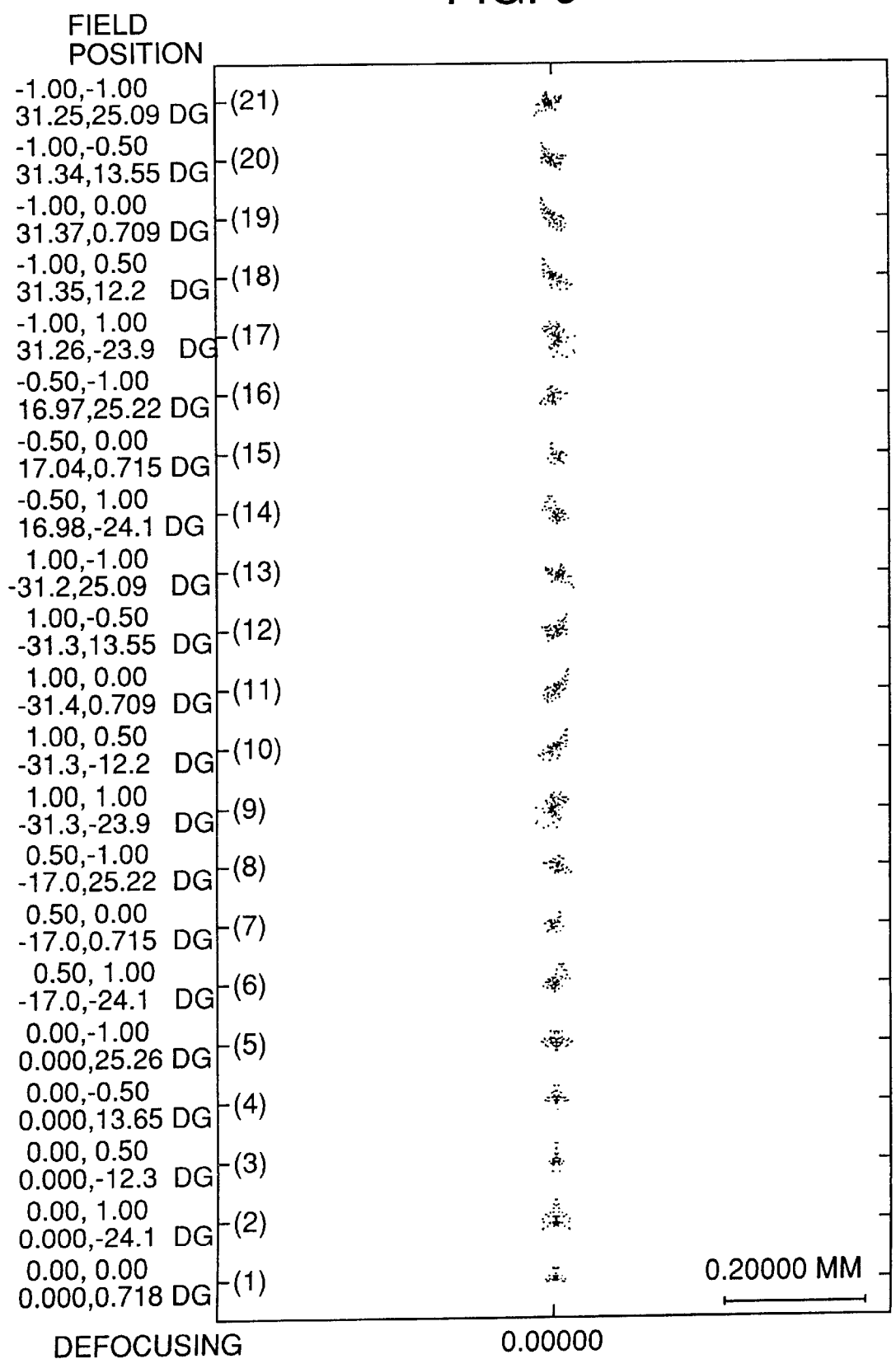
FIG. 9 is a spot diagram of the display optical system of Example 2.
Figure 10:
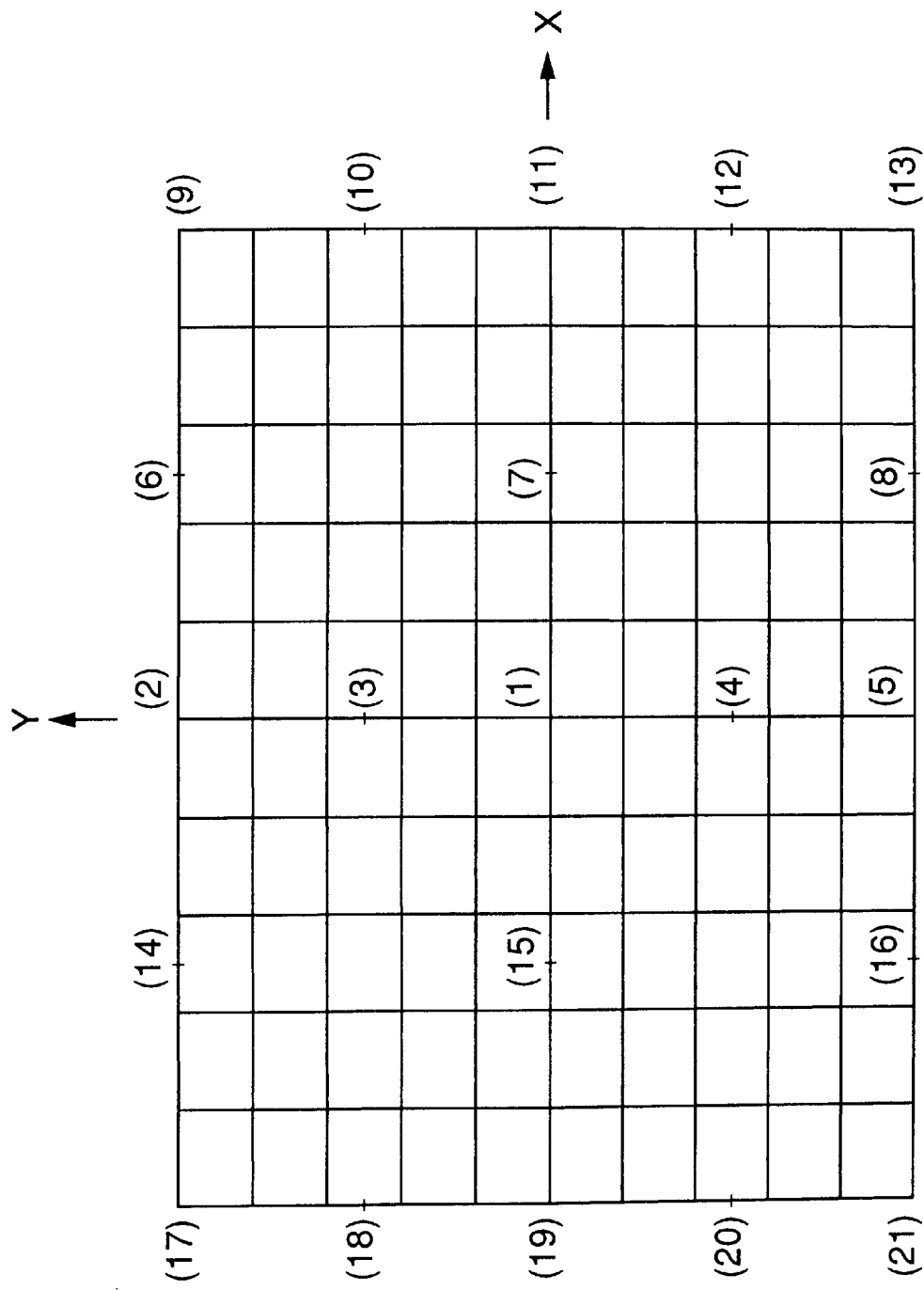
FIG. 10 is a distortion diagram of the display optical system of Example 2, with values actually measured.

Moreover, FIGS. 4 and 9 are spot diagrams of Examples 1 and 2, respectively. FIGS. 5 and 10 are distortion diagrams of Examples 1 and 2, respectively, with values actually measured. In the spot diagrams, the numerals in parentheses, e.g. (1), (2), (3), ..., used to identify the individual point images correspond to the numerals marked on the grid of the distortion diagrams, and thus indicate the evaluation positions of the point images. As will be understood from these diagrams, the display optical systems of the first and second embodiments of the present invention offer satisfactorily high performance in terms of distortion correction and point-image formation.

Note that the evaluated area extends ±566.0 in the X-axis direction and ±340.0 in the Y-axis direction on the object plane (the screen). Moreover, the evaluation positions of the spot diagrams are located at the following coordinates (on the reduction side).

Lastly, the values corresponding to the above-described conditions as observed in the examples are listed below.

TABLE 1

Construction Data of Example 1

Aperture Stop Effective Radius   14.393

| Surface | Radius of Curvature | Axial Distance | Refractive Index for d line | Abbe Number |
|---|---|---|---|---|
| Object Plane(Screen) | ∞ | | | |
| | | 845.100 | AIR | |
| r1 | ∞ | | | |
| r2 | 68.313 | | | |
| | | 4.732 | 1.7545 | 51.570 |
| r3 | 38.611 | | | |
| | | 16.199 | AIR | |
| r4 | 142.838 | | | |
| | | 7.893 | 1.4875 | 70.440 |
| r5* | 32.380 | | | |
| | | | AIR | |
| r6 | 56.080 | | | |
| | | 6.737 | 1.6464 | 30.151 |
| r7 | −1392.034 | | | |
| | | | AIR | |
| Aperture Stop | ∞ | | | |
| | | | AIR | |

TABLE 1-continued

Construction Data of Example 1

| | | | | |
|---|---|---|---|---|
| r9 | −76.022 | | | |
| | | 15.000 | 1.8121 | 26.517 |
| r10 | 51.424 | | | |
| | | 0.100 | AIR | |
| r11* | 45.198 | | | |
| | | 15.000 | 1.5652 | 61.673 |
| r12 | −56.194 | | | |
| | | | AIR | |
| r13 | 135.138 | | | |
| | | 7.126 | 1.5168 | 65.261 |
| r14 | 1624.175 | | | |
| | | | AIR | |
| r15 | ∞ | | | |
| | | 1.000 | 1.5168 | 65.261 |
| r16 | ∞ | | | |
| | | 1.000 | 1.5168 | 65.261 |
| r17 | ∞ | | | |
| | | AIR | | |
| r18 | ∞ | | | |
| | | 1.000 | 1.5168 | 65.261 |
| r19 | ∞ | | | |
| | | 1.000 | 1.5168 | 65.261 |
| r20 | ∞ | | | |
| | | AIR | | |
| r21 | 77.998 | | | |
| | | 5.363 | 1.4875 | 70.440 |
| r22 | ∞ | | | |
| Image Plane | | | | |
| (Display Device) | ∞ | | | |
| r24 | common with r22 | | | |
| r25 | common with r21 | | | |
| r26 | common with r20 | | | |
| r27 | common with r19 | | | |
| r28 | common with r18 | | | |
| r29 | common with r17 | | | |
| r30 | common with r16 | | | |
| r31 | common with r15 | | | |

Aspherical Coefficients of 5th Surface (r5)

$k = -0.800000$
$A = -0.917472 \times 10^{-6}$
$B = -0.671131 \times 10^{-9}$
$C = -0.121490 \times 10^{-12}$
$D = -0.327647 \times 10^{-15}$ Aspherical Coefficients of 11th Surface (r11)

$k = 0.000000$
$A = -0.207051 \times 10^{-5}$
$B = -0.341780 \times 10^{-8}$
$C = 0.224302 \times 10^{-10}$
$D = -0.611064 \times 10^{-13}$
$E = 0.635052 \times 10^{-16}$ Decentering(Reference Surface = r1)

| | | | | | |
|---|---|---|---|---|---|
| r2 | XDE = 0.000 | YDE = 15.740 | ZDE = 0.000 | ADE = 0.323 | |
| r6 | XDE = 0.000 | YDE = −0.405 | ZDE = 177.144 | ADE = −0.903 | |
| Aperture stop | | | | | |
| | XDE = 0.000 | YDE = 0.000 | ZDE = 205.186 | ADE = 0.000 | |
| r9 | XDE = 0.000 | YDE = −1.216 | ZDE = 208.186 | ADE = −0.485 | |
| r13 | XDE = 0.000 | YDE = 20.402 | ZDE = 239.470 | ADE = −4.931 | |
| r15 | XDE = 0.000 | YDE = 17.210 | ZDE = 239.470 | ADE = −4.931 | BDE = 45.000 |
| r18 | XDE = 0.000 | YDE = 12.913 | ZDE = 326.274 | ADE = −4.931 | BDE = −45.000 |
| r21 | XDE = 0.000 | YDE = 0.371 | ZDE = 239.470 | ADE = 355.303 | |
| Image plane | | | | | |
| | XDE = 0.000 | YDE = −0.452 | ZDE = 361.613 | ADE = −9.518 | |

TABLE 2

Construction Data of Example 2

Aperture Stop Effective Radius    13.677

| Surface | Radius of Curvature | Axial Distance | Refractive Index for d line | Abbe Number |
|---|---|---|---|---|
| Object Plane(Screen) | ∞ | | | |
| | | 850.000 | AIR | |
| r1 | ∞ | | | |
| r2 | 61.250 | | | |
| | | 7.500 | 1.7545 | 51.570 |
| r3 | 36.485 | | | |
| | | 19.408 | AIR | |
| r4 | 157.844 | | | |
| | | 7.500 | 1.6184 | 57.788 |
| r5* | 30.010 | | | |
| | | | AIR | |
| r6 | 444.128 | | | |
| | | 15.000 | 1.6892 | 27.192 |
| r7 | −175.324 | | | |
| | | | AIR | |
| Aperture Stop | ∞ | | | |
| | | | AIR | |
| r9 | 208.089 | | | |
| | | 7.500 | 1.8467 | 23.820 |
| r10 | 67.297 | | | |
| | | 2.000 | AIR | |
| r11* | 68.974 | | | |
| | | 15.000 | 1.4875 | 70.440 |
| r12* | −49.723 | | | |
| | | | AIR | |
| r13 | 334.462 | | | |
| | | 15.492 | 1.5632 | 61.841 |
| r14 | −3373.452 | | | |
| | | | AIR | |
| r15 | ∞ | | | |
| | | 1.000 | 1.5168 | 65.261 |
| r16 | ∞ | | | |
| | | 1.000 | 1.5168 | 65.261 |
| r17 | ∞ | | | |
| | | AIR | | |
| r18 | ∞ | | | |
| | | 1.000 | 1.5168 | 65.261 |
| r19 | ∞ | | | |
| | | 1.000 | 1.5168 | 65.261 |
| r20 | ∞ | | | |
| | | AIR | | |
| r21 | 61.804 | | | |
| | | 10.679 | 1.4875 | 70.440 |
| r22 | 2354.272 | | | |
| Image Plane (Display Device) | ∞ | | | |
| r24 | common with r22 | | | |
| r25 | common with r21 | | | |
| r26 | common with r20 | | | |
| r27 | common with r19 | | | |
| r28 | common with r18 | | | |
| r29 | common with r17 | | | |
| r30 | common with r16 | | | |
| r31 | common with r15 | | | |

Aspherical Coefficients of 5th Surface (r5)

$k = -0.800000$
$A = -0.134908 \times 10^{-5}$
$B = -0.140452 \times 10^{-8}$
$C = 0.604628 \times 10^{-12}$
$D = -0.798525 \times 10^{-15}$ Aspherical Coefficients of 11th Surface (r11)

$k = 0.000000$
$A = -0.481753 \times 10^{-5}$
$B = -0.182958 \times 10^{-7}$
$C = 0.571787 \times 10^{-10}$
$D = -0.181613 \times 10^{-12}$
$E = 0.519417 \times 10^{-16}$ TABLE 2-continued Construction Data of Example 2

Aspherical Coefficients of 12th Surface (r12)

k = 0.000000
A = −0.371109 × $10^{-5}$
B = −0.387203 × $10^{-8}$
C = −0.204169 × $10^{-10}$
D = 0.417744 × $10^{-13}$
E = −0.101651 × $10^{-15}$

Decentering(Reference Surface = r1)

| | | | | |
|---|---|---|---|---|
| r2 | XDE = 0.000 | YDE = 12.181 | ZDE = 0.000 | ADE = 0.000 |
| r6 | XDE = 0.000 | YDE = 0.075 | ZDE = 110.472 | ADE = 0.000 |
| r8 | XDE = 0.000 | YDE = 0.075 | ZDE = 110.472 | ADE = 0.000 |
| r9 | XDE = 0.000 | YDE = 0.075 | ZDE = 255.930 | ADE = 0.000 |
| r13 | XDE = 0.000 | YDE = 50.826 | ZDE = 277.207 | ADE = 3.204 |
| r15 | XDE = 0.000 | YDE = 0.000 | ZDE = 316.458 | ADE = −19.000 | BDE = 45.000 |
| r18 | XDE = 0.000 | YDE = 0.000 | ZDE = 358.643 | ADE = −19.000 | BDE = −45.000 |
| Image Plane | | | | |
| | XDE = 0.000 | YDE = 1.499 | ZDE = 410.000 | ADE = −7.466 |

TABLE 3

Coordinate System

Example 1

| | ( X, | Y) |
|---|---|---|
| (1): | ( 0, | 0) |
| (2): | ( 0, | 340) |
| (3): | ( 0, | 170) |
| (4): | ( 0, | -170) |
| (5): | ( 0, | -340) |
| (6): | ( 283, | 340) |
| (7): | ( 283, | 0) |
| (8): | ( 283, | -340) |
| (9): | ( 566, | 340) |
| (10): | ( 566, | 170) |
| (11): | ( 566, | 0) |
| (12): | ( 566, | -170) |
| (13): | ( 566, | -340) |
| (14): | ( -283, | 340) |
| (15): | ( -283, | 0) |
| (16): | ( -283, | -340) |
| (17): | ( -566, | 340) |
| (18): | ( -566, | 170) |
| (19): | ( -566, | 0) |
| (20): | ( -566, | -170) |
| (21): | ( -566, | -340) |

Example 2

| | ( X, | Y) |
|---|---|---|
| (1): | ( 0, | 0) |
| (2): | ( 0, | 419.9) |
| (3): | ( 0, | 209.9) |
| (4): | ( 0, | -209.9) |
| (5): | ( 0, | -419.9) |
| (6): | ( 279.4, | 419.9) |
| (7): | ( 279.4, | 0) |
| (8): | ( 279.4, | -419.9) |
| (9): | ( 588.8, | 419.9) |
| (10): | ( 588.8, | 209.9) |
| (11): | ( 588.8, | 0) |
| (12): | ( 588.8, | -209.9) |
| (13): | ( 588.8, | -419.9) |
| (14): | (-279.4, | 419.9) |
| (15): | (-279.4, | 0) |
| (16): | (-279.4, | -419.9) |
| (17): | (-588.8, | 419.9) |
| (18): | (-588.8, | 209.9) |
| (19): | (-588.8, | 0) |
| (20): | (-588.8, | -209.9) |
| (21): | (-588.8, | -419.9) |

TABLE 4

Values Corresponding to Conditions

| | $\Phi p \times lp$ | $\theta o$ | $|\Delta'_{mir}/\Delta_{element}|$ | |
|---|---|---|---|---|
| Example 1 | 0.704 | 10.45 | r3: | 2.19 |
| | | | r5: | 1.98 |
| | | | r9: | 1.58 |
| | | | r13: | 0.20 |
| Example 2 | 0.770 | 11.27 | r10: | 6.62 |
| | | | r13: | 0.08 |

What is claimed is:

1. A display optical system comprising:
   an illumination optical system for emitting illumination light;
   a plurality of reflection-type display devices for individually modulating the illumination light emitted from the illumination optical system and reflecting the illumination light thus modulated as projection light;
   a projection optical system for projecting the projection light, the projection optical system having at least one optical element included therein arranged so as to be decentered with respect to other optical elements included therein; and
   a plane-parallel mirror for separating the illumination light into light components by reflecting a part and transmitting another part of the illumination light and then directing the light components thus separated individually to corresponding ones of the reflection-type display devices, and for integrating together the projection light reflected individually from the reflection-type display devices and then directing the projection light thus integrated together to the projection optical system.

2. A display optical system as claimed in claim 1, wherein the display optical system has three reflection-type display devices, and has two plane-parallel mirrors for light separation/integration.

3. A display optical system as claimed in claim 2, wherein the two plane-parallel mirrors are disposed so as to be inclined in opposite directions.

4. A display optical system as claimed in claim 2, wherein the two plane-parallel mirrors are so arranged that their sectional lines, as taken along a plane including a light source of the illumination optical system, a center of an aperture stop of the projection optical system, and a center of a projected image, is parallel to each other.

5. A display optical system as claimed in claim 1, further comprising:
a positively-powered lens element disposed between the plane-parallel mirror and the reflection-type display device.

6. A display optical system as claimed in claim 5, wherein the positively-powered lens element fulfills the following condition:

$$0.5 < \Phi p \times lp < 1.0$$

wherein
Φp represents an optical power of the positively-powered lens element; and
lp represents a length of an optical path between two optical elements disposed immediately on both sides of the plane-parallel mirrors, as traveled by a light ray that travels toward a center of an image plane.

7. A display optical system as claimed in claim 1, wherein rotation axes about which the plane-parallel mirrors are inclined lie on a plane including a decentering direction of the decentered optical element included in the projection optical system.

8. A display optical system as claimed in claim 1, wherein the following conditions are fulfilled:

$$0.05 \leq |\Delta'_{mir} / \Delta_{element}| \leq 10$$

$$\Delta_{element} = \frac{(-1)\left(\frac{\partial^2 f}{\partial y^2} - \frac{\partial^2 f}{\partial x^2}\cos(\theta_1)\cdot\cos(\theta'_1)\right)}{\frac{\partial^2 f}{\partial x^2}\cdot\frac{\partial^2 f}{\partial y^2}(n\cdot\cos(\theta_1) - n'\cdot\cos(\theta'_1))}$$

$$\Delta'_{mir} = \{\cos(\phi) - \sin(\phi)\}\Delta_{mir}$$

$$\Delta_{mir} = (d_1 + d_2)\{\cos(2\cdot\theta'_m) - \cos(2\cdot\theta_m)\}/2\cdot n_m\cdot\{\cos(\theta'_m)\}^2$$

wherein
n represents a refractive index of a medium that exists immediately in front of an element;
n' represents a refractive index of a medium that exists immediately behind the element;
$\theta_1$ represents an angle of incidence with respect to the element;
$\theta'_1$ represents an angle of emergence with respect to the element;
f represents a formula defining a surface shape in the form of f=f(x, y); and $$\frac{\partial^2 f}{\partial x^2}, \frac{\partial^2 f}{\partial y^2}$$

represent second-order derivatives of f in X and Y directions, respectively, at an incident point of a base ray, and thus represent local curvatures in the X and Y directions,
$d_1$ represents an optical path length traveled by light rays passing through a first plate mirror;
$d_2$ represents an optical path length traveled by light rays passing through a second plate mirror;
$\theta_m$ represents an angle of incidence at which the light rays strike a front surface of the first plate mirror;
$\theta'_m$ represents an angle of emergence at which the light rays exit from the front surface of the first plate mirror;
$n_m$ represents a refractive index of the plate mirror; and
Φ represents a rotation angle of planes of incidence and emergence through which the light rays enter and exit from the plate mirrors relative to planes of incidence and emergence through which light rays enter and exit from other elements, as observed on an X-Y plane.

9. A display optical system as claimed in claim 1, wherein the decentered optical element is a lens element.

10. A display optical system as claimed in claim 1, wherein the decentered optical element is an aperture stop.

11. A display optical system comprising:
an illumination optical system for emitting illumination light;
a plurality of reflection-type display devices for individually modulating the illumination light emitted from the illumination optical system and reflecting the illumination light thus modulated as projection light;
a projection optical system for projecting the projection light; and
a plane-parallel mirror for separating the illumination light into light components by reflecting a part and transmitting another part of the illumination light and then directing the light components thus separated individually to corresponding ones of the reflection-type display devices, and for integrating together the projection light reflected individually from the reflection-type display devices and then directing the projection light thus integrated together to the projection optical system,
wherein the projection optical system has optical elements included therein arranged so as to allow separation of optical paths of the illumination light and the projection light.

12. A display optical system comprising:
an illumination optical system for emitting illumination light;
a plurality of reflection-type display devices for individually modulating the illumination light emitted from the illumination optical system and reflecting the illumination light thus modulated as projection light;
a projection optical system for projecting the projection light; and
a plane-parallel mirror for separating the illumination light into light components by reflecting a part and transmitting another part of the illumination light and then directing the light components thus separated individually to corresponding ones of the reflection-type display devices, and for integrating together the projection light reflected individually from the reflection-type display devices and then directing the projection light thus integrated together to the projection optical system,
wherein the projection optical system has optical elements included therein arranged so as to correct astigmatic difference caused by the plane-parallel mirror.

* * * * *